(12) United States Patent
Wohlfarth

(10) Patent No.: US 9,985,431 B2
(45) Date of Patent: May 29, 2018

(54) BIDIRECTIONAL CURRENT LIMITER

(71) Applicant: HAMILTON SUNDSTRAND CORPORATION, Charlotte, NC (US)

(72) Inventor: Scott C. Wohlfarth, Edgerton, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 332 days.

(21) Appl. No.: 14/886,788

(22) Filed: Oct. 19, 2015

(65) Prior Publication Data

US 2017/0110876 A1 Apr. 20, 2017

(51) Int. Cl.
*H02H 9/02* (2006.01)
*H02H 9/00* (2006.01)

(52) U.S. Cl.
CPC .............. *H02H 9/02* (2013.01); *H02H 9/001* (2013.01); *H02H 9/005* (2013.01)

(58) Field of Classification Search
CPC ........... H02H 9/02; H02H 9/001; H02H 9/005
See application file for complete search history.

(56) References Cited

U.S. PATENT DOCUMENTS

| | | | |
|---|---|---|---|
| 5,122,724 A | 6/1992 | Criss | |
| 6,225,797 B1 | 5/2001 | Willis et al. | |
| 6,831,447 B1 | 12/2004 | Wittenberg | |
| 7,266,000 B2 | 9/2007 | Terdan | |
| 7,408,755 B1 | 8/2008 | Ye et al. | |
| 7,961,486 B2 | 6/2011 | Carcouet et al. | |
| 8,582,267 B2 | 11/2013 | Pellegrino | |
| 2008/0204958 A1* | 8/2008 | Shearon | H02H 3/18 361/93.9 |
| 2012/0026636 A1 | 2/2012 | Chai et al. | |
| 2013/0154613 A1* | 6/2013 | Bucsa | G01R 19/00 324/96 |
| 2013/0278300 A1 | 10/2013 | Domingo et al. | |

FOREIGN PATENT DOCUMENTS

EP 2790285 A1 10/2014

* cited by examiner

*Primary Examiner* — Scott Bauer
(74) *Attorney, Agent, or Firm* — Cantor Colburn LLP

(57) ABSTRACT

Embodiments are directed to a current limiter having an inrush limiting stage and a discharge limiting stage. The inrush limiting stage is communicatively coupled in series with the discharge limiting stage. The inrush limiting stage is configured to receive a first input current in a first direction, perform an inrush limiting operation on the first input current and pass an inrush limited output current in the first direction to the discharge limiting stage. The discharge limiting stage is configured to pass the inrush limited output current substantially unchanged in the first direction. The discharge limiting stage is further configured to receive a second input current in a second direction, perform a discharge limiting operation on the second input current and pass a discharge limited output current in the second direction to the inrush limiting stage. The inrush limiting stage is further configured to pass the discharge limited output current substantially unchanged in the second direction.

20 Claims, 9 Drawing Sheets

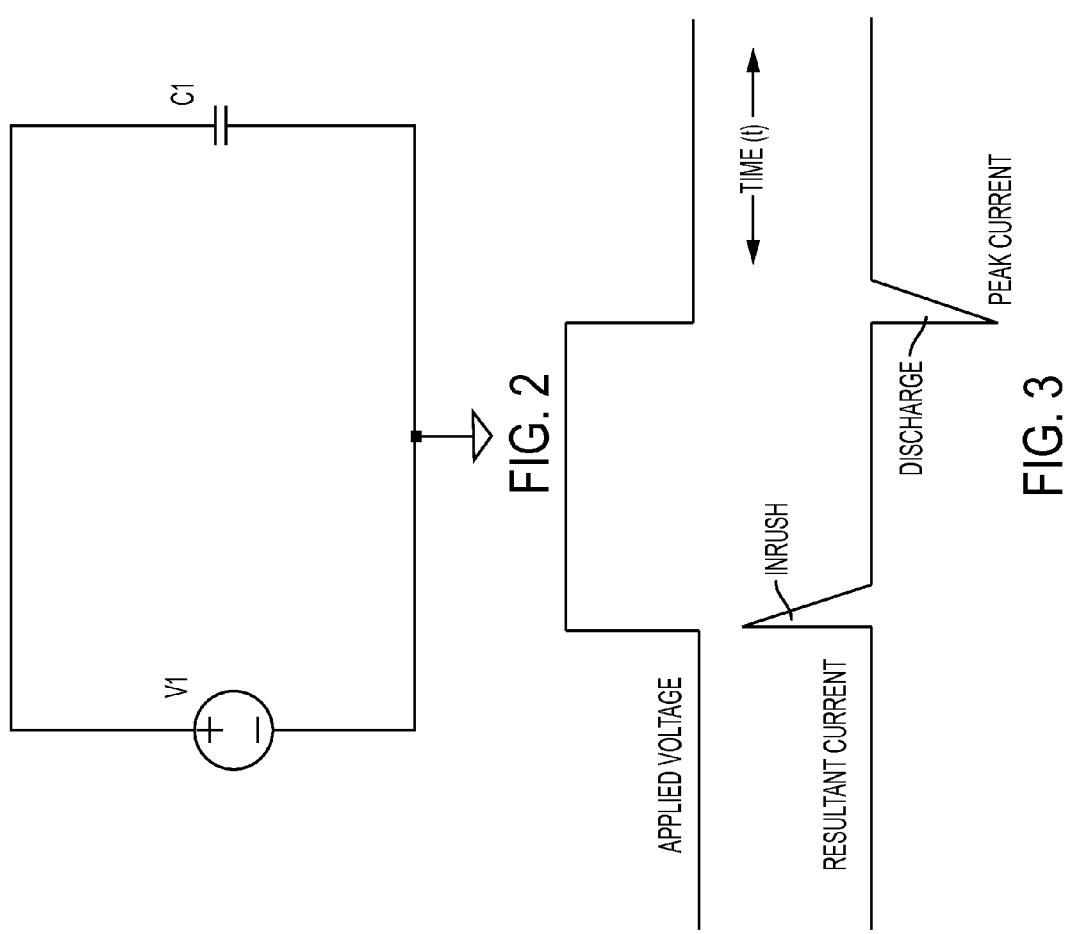

BIDIRECTIONAL CURRENT LIMITER

GOVERNMENT LICENSE RIGHTS

The invention described in the present disclosure was made with government support under government contract number NNM07AB03C awarded by the National Aeronautics and Space Administration. The government has certain rights in the invention.

BACKGROUND OF THE DISCLOSURE

The present disclosure relates generally to protecting circuits and their components from current surges. More specifically, the present disclosure relates to a bidirectional current limiter that limits both inrush and discharge currents.

The overall effectiveness of an electronic circuit depends on a variety of performance-related factors such as hold-up time during a power interruption, inrush current and discharge current.

The phrase "hold-up time" refers to the total amount of time, often measured in milliseconds, that a circuit can maintain operation within the specified voltage range after a loss of input power. Many "high-reliability" systems (e.g., aerospace systems) require that certain critical circuits or modules maintain operation during short term input-power interruptions. Input-power interruptions may be caused by a short-circuit of the input power wires, or by a switchover from a primary power source to a redundant power source when a power bus failure occurs. One method of maintaining circuit operation during a power interruption is to provide the circuit with bulk capacitive loads, which store energy that can be accessed and utilized during the power interruption.

Inrush current is the maximum instantaneous input current drawn by an electrical circuit when power is first applied to it. For example, when power is initially applied to a load circuit, a large inrush current flows that exceeds a steady-state current value of the load circuit and its components. When the load circuit includes a large capacitance, which may be required to meet a desired current hold-up time, during the initial application of power a large current flows into the load circuit to charge the capacitors. Additionally, immediately after power is turned on, other non-capacitive load circuit components can have low resistance, which also causes large current flows. As the load circuit components begin to generate heat and warm up, their resistance increases and the current drops to the steady-state current.

When the power applied to a load circuit is abruptly changed, for example, by a short circuit between the power input wires, a low resistance connection can occur between the power input wires. This results in excessive discharge current surges flowing out of the circuit's capacitive loads, which are greater than required to meet the circuit's desired hold-up time. The excess discharge current can damage upstream circuitry by producing very high temperatures due to the excessive power dissipation in the circuit. If the capacitive load is fully charged and high-voltage, the size of the resulting discharge current and power dissipation could cause significant damage to upstream circuit components.

To illustrate the concept of inrush current, FIG. 1 depicts an example of a current waveform that may occur when power is applied to a load circuit. When the power is turned on, current begins to flow until it reaches the peak current value, which is larger than the steady-state current value. The current value then gradually decreases until it stabilizes at the steady-state current. The shaded portion of the waveform that is prior to when the current reaches the steady-state is the inrush current. If the size of the inrush current exceeds what is allowed by the load circuit or its component parts, depending on the magnitude of the inrush current (i.e., the difference between the peak current value and the steady-state current value) and its duration (i.e., the pulse width), the load circuit and/or its component part(s) may overheat, potentially causing the load circuit and/or its component parts to malfunction or break down. A diagram similar to FIG. 1 may be generated for discharge current, which occurs further along the time axis (i.e., "x" axis) in the positive direction, and is a mirror image of the inrush current. Accordingly, the discharge current flows in the negative or opposite direction along the current axis (i.e., "y" axis).

As noted above, the overall effectiveness of a circuit depends on a variety of performance-related factors such as hold-up time during a power interruption, inrush current and discharge current. When hold-up time is addressed by, inter alia, providing a relatively large capacitive load in the circuit, the potential for inrush currents and discharge currents is even greater. It is desirable to provide a simple and efficient circuit configuration that delivers desired capacitor-based hold-up times, inrush current limits and/or discharge current limits.

BRIEF DESCRIPTION OF THE DISCLOSURE

Embodiments are directed to a current limiter having an inrush limiting stage, and a discharge limiting stage. The inrush limiting stage is communicatively coupled in series with the discharge limiting stage. The inrush limiting stage is configured to receive a first input current in a first direction, perform an inrush limiting operation on the first input current and pass an inrush limited output current in the first direction to the discharge limiting stage. The discharge limiting stage is configured to pass the inrush limited output current substantially unchanged in the first direction. The discharge limiting stage is further configured to receive a second input current in a second direction, perform a discharge limiting operation on the second input current and pass a discharge limited output current in the second direction to the inrush limiting stage. The inrush limiting stage is further configured to pass the discharge limited output current substantially unchanged in the second direction.

Embodiments are further directed to a method of forming a current limiter. The method includes providing an inrush limiting stage and a discharge limiting stage communicatively coupled in series with the inrush limiting stage. The method further includes configuring the inrush limiting stage to receive a first input current in a first direction, perform an inrush limiting operation on the first input current and pass an inrush limited output current in the first direction to the discharge limiting stage. The method further includes configuring the discharge limiting stage to pass the inrush limited output current substantially unchanged in the first direction. The method further includes configuring the discharge limiting stage to receive a second input current in a second direction, perform a discharge limiting operation on the second input current and pass a discharge limited output current in the second direction to the inrush limiting stage. The method further includes configuring the inrush limiting stage to pass the discharge limited output current substantially unchanged in the second direction.

Embodiments are further directed to a current limited circuit including a voltage source, a capacitive load communicatively coupled to the voltage source and a bidirectional current limiter communicatively coupled to the voltage source and the capacitive load. The bidirectional current limiter includes an inrush limiting stage and a discharge limiting stage communicatively coupled in series with the inrush limiting stage. The inrush limiting stage is configured to receive a first input current in a first direction, perform an inrush limiting operation on the first input current and pass an inrush limited output current in the first direction to the discharge limiting stage. The discharge limiting stage is configured to pass the inrush limited output current substantially unchanged in the first direction. The discharge limiting stage is further configured to receive a second input current in a second direction, perform a discharge limiting operation on the second input current and pass a discharge limited output current in the second direction to the inrush limiting stage. The inrush limiting stage is further configured to pass the discharge limited output current substantially unchanged in the second direction.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 2 depicts a diagram of a circuit having no inrush or discharge limiting circuitry;

FIG. 3 depicts a waveform illustrating the inrush and discharge currents that can occur in the circuit shown in FIG. 2;

DETAILED DESCRIPTION OF THE DISCLOSURE

Figure 1:
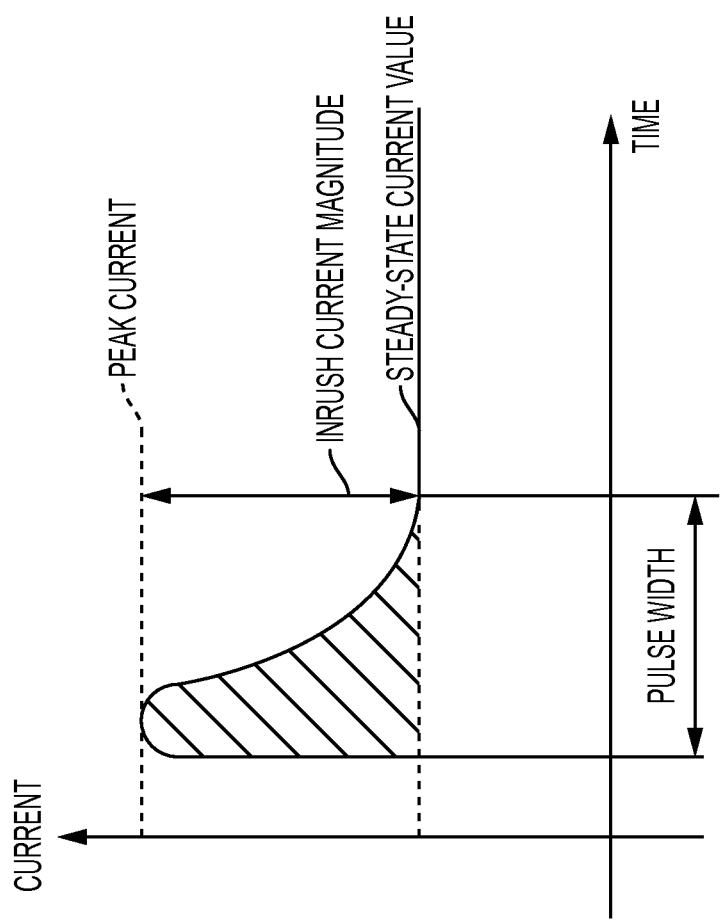
FIG. 1 depicts a current waveform that illustrates the inrush current that may occur when power is applied to a load circuit.

Embodiments described herein relate to a bidirectional current limiter that limits both inrush and discharge currents. The bidirectional current limiter may be provided in a circuit having a power source and a capacitive load. In one or more embodiments, the bidirectional current limiter includes an inrush current limiter stage in series with a discharge current limiter stage. Currents can flow in both directions through the inrush current limiter stage and the discharge current limiter stage.

The functions performed by the inrush current limiter stage and the discharge current limiter stage depend on the magnitude and direction of the current that passes through the particular stage. For example, when power is initially applied to the circuit, the magnitude of current that passes through the inrush current limiter stage in a first direction (e.g., clockwise) can exceed inrush limits. The inrush current limiter stage senses the current in the first direction, performs an inrush limiting operation on the current and passes the inrush limited current in the first direction to the discharge current limiter stage. Because the inrush limited current is moving in the first direction, the discharge current limiter stage functions substantially as a closed switch and passes the inrush limited current substantially unchanged.

Similarly, when the power being applied to the circuit is abruptly interrupted, for example by a short circuit across the input/output wires of the power source, the capacitive load will attempt to discharge its stored energy through its input terminals causing discharge current to flow through the circuit in a second direction (e.g., counterclockwise). The magnitude of discharge current that passes through the discharge current limiter stage in the second direction can exceed discharge limits. The discharge current limiter stage senses the discharge current in the second direction, performs a discharge limiting operation on the discharge current and passes the discharge limited current in the second direction to the inrush current limiter stage. Because the discharge limited current is moving in the second direction, the inrush current limiter stage functions substantially as a closed switch and passes the discharge limited current substantially unchanged.

In one or more embodiments, the components of the inrush current limiter stage are configured as mirror-images of the components of the discharge current limiter stage, thereby creating an inverse-series relationship between the inrush current limiter stage and the discharge current limiter stage.

In one or more embodiments, the above-described circuit includes an internal power supply circuit that draws a portion of the input power from the voltage source, regulates it and provides the regulated power to active components of the bidirectional current limiter. The regulated power is further divided to independently supply reference voltages that are used by the inrush current limiter stage and the discharge current limiter stage to independently set the inrush current limit and the discharge current limit, respectively. Accordingly, the inrush current limit and the discharge current limit may be set to different values. When the power being applied to the circuit is abruptly interrupted, the internal power source receives power discharged from the capacitive load and uses the capacitive discharge power to continue supplying regulated power to active components of the bidirectional current limiter to maintain circuit operation during at least some portion of the desired circuit hold-up time.

Accordingly, the inrush current limiter stage and the discharge current limiter stage each acts as a short circuit on currents in one direction (e.g., clockwise inrush current) and an open circuit on currents in the other direction (e.g., counterclockwise discharge current). By providing the electronic components of the inrush current limiter stage and the discharge current limiter stage as mirror images of one another, and by placing the inrush current limiter stage and the discharge current limiter stage in series, an inverse series relationship is established between the inrush current limiter stage and the discharge limiting stage. Thus, there is never a short circuit condition through both stages at the same time, and the current through each stage can be independently switched.

FIG. 2 depicts a circuit 200 having a voltage source 202 and a capacitive load 204 but no inrush limiting or discharge limiting, and FIG. 3 depicts applied voltage and resultant current waveforms that can occur in circuit 200 shown in FIG. 2. When charging capacitive load 204, depending on the amount of capacitance and the voltage applied, a certain amount of energy must be supplied during a charge and a certain amount of energy must be absorbed or dissipated during a discharge. Without the use of current limiting, inrush and discharge peak currents (shown in FIG. 3) are only limited by the combined series impedances in the circuit. Left uncontrolled, the resultant inrush and discharge peak currents can be thousands of amperes depending on the rise time of the applied voltage and the value of the series impedance.

Figure 4:
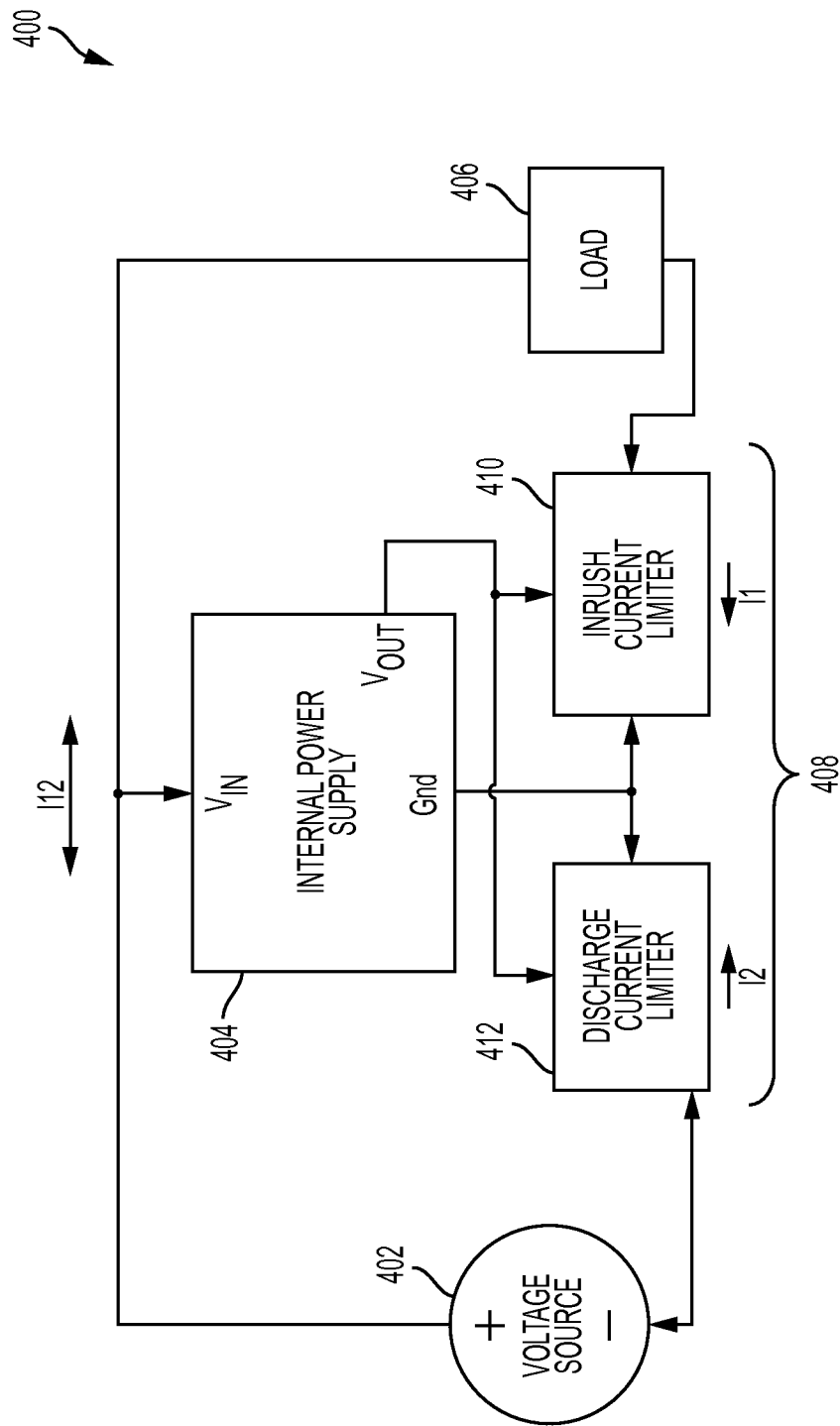
FIG. 4 depicts a block diagram illustrating a circuit having a negative side, bidirectional current limiter according to the present disclosure.

FIG. 4 depicts a block diagram illustrating a circuit 400 having a bidirectional current limiter 408 according to the present disclosure. Circuit 400 includes a voltage source 402, an internal power supply 404, a load 406 and bidirectional current limiter 408, configured and arranged as shown. Bidirectional current limiter 408 includes an inrush current limiter stage 410 in series with a discharge current limiter stage 412. Voltage source 402 provides power to load 406. Internal power supply 404 receives at $V_{IN}$ a portion of the power supplied by voltage source 402, and provides a ground (Gnd) connection and a regulated $V_{OUT}$ to inrush current limiter stage 410 and discharge current limiter stage 412.

The functions performed by inrush current limiter stage 410 and discharge current limiter stage 412 depend on the direction of the current that passes through the particular limiter stage 410, 412. Current passing through inrush current limiter stage 410 in a first direction (e.g., clockwise) causes inrush current limiter stage 410 to sense the current, perform an inrush limiting operation on the current and pass the inrush limited current in the first direction to discharge current limiter stage 412. Because the inrush limited current is moving in the first direction, discharge current limiter 412 functions substantially as a closed switch and passes the inrush limited current substantially unchanged.

Similarly, when the power being applied to circuit 400 by voltage source 402 is abruptly interrupted, for example by a short circuit across the input/output wires of power source 402, any capacitive components of load 406 will attempt to discharge their stored energy back through their input terminals causing discharge current to flow through circuit 400 in a second direction (e.g., counterclockwise). The magnitude of discharge current that passes through discharge current limiter stage 412 in the second direction can exceed discharge limits. Discharge current limiter stage 412 senses the discharge current in the second direction, performs a discharge limiting operation on the discharge current and passes the discharge limited current in the second direction to inrush current limiter stage 410. Because the discharge limited current is moving in the second direction, inrush current limiter stage 410 functions substantially as a closed switch and passes the discharge limited current substantially unchanged.

Internal power supply 404 draws a portion of the input power from voltage source 402, regulates it and provides the regulated power to active components of bidirectional current limiter 408. The regulated power is further divided to independently supply reference voltages that are used by inrush current limiter stage 410 and discharge current limiter stage 412 to independently set the inrush current limit and the discharge current limit, respectively. When the power being applied to circuit 400 by voltage source 402 is abruptly interrupted, internal power source 404 receives power discharged from any capacitive components of load 406 and uses the capacitive discharge power to continue supplying regulated power to active components of bidirectional current limiter 408 to maintain circuit operation during at least some portion of the desired circuit hold-up time.

Figure 5:
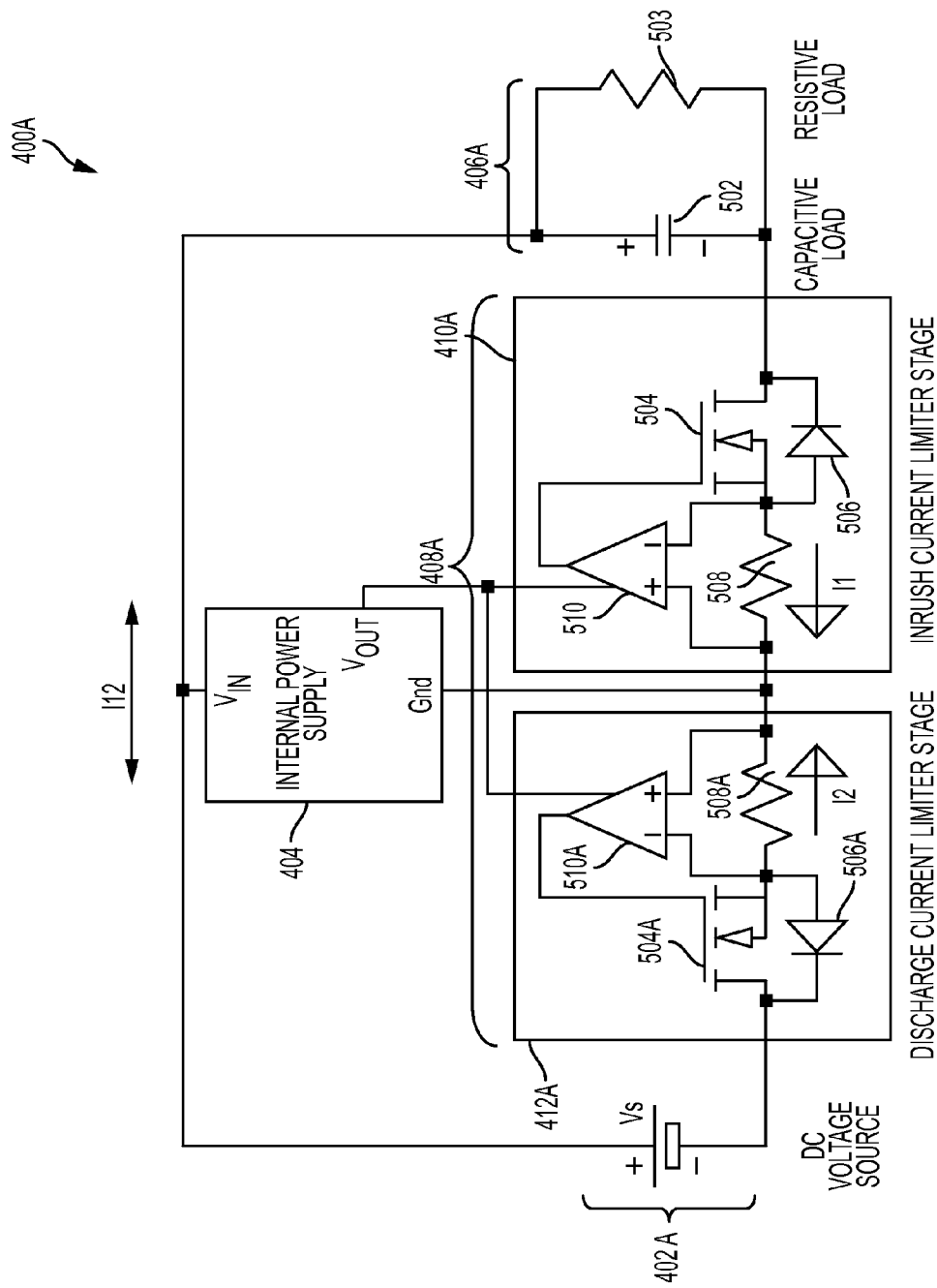
FIG. 5 depicts a circuit diagram illustrating a more detailed embodiment of the bidirectional current limiter shown in FIG. 4.

FIG. 5 depicts a circuit 400A having a bidirectional current limiter 408A according to the present disclosure. Bidirectional current limiter 408A is more detailed embodiment of bidirectional current limiter 408 shown in FIG. 4. Circuit 400A includes a direct current (DC) voltage source 402A, internal power supply 404, a load 406A and bidirectional current limiter 408A, configured and arranged as shown. Load 406A includes a capacitive load 502 and a resistive load 503, configured and arranged as shown. Bidirectional current limiter 408A includes an inrush current limiter stage 410A in series with a discharge current limiter stage 412A. DC voltage source 402A provides power to load 406A. Internal power supply 404 receives at $V_{IN}$ a portion of the power supplied by dc voltage source 402, and provides a Gnd connection and $V_{OUT}$ to inrush current limiter stage 410A and discharge current limiter stage 412A.

The functions performed by inrush current limiter stage 410A and discharge current limiter stage 412A depend on the direction of the current that passes through the particular limiter stage 410A, 412A. Current passing through inrush current limiter stage 410A in a first direction (e.g., clockwise current ID causes inrush current limiter stage 410A to sense the current, perform an inrush limiting operation on the current and pass the inrush limited current in the first direction to discharge current limiter stage 412A. Because the inrush limited current is moving in the first direction, discharge current limiter stage 412A functions substantially as a closed switch and passes the inrush limited current substantially unchanged.

Similarly, when the power being applied to circuit 400A by voltage source 402A is abruptly interrupted, for example by a short circuit across the input/output wires of power source 402A, capacitive load 502 will attempt to discharge its stored energy back through its input terminal causing discharge current to flow through circuit 400A in a second direction (e.g., counterclockwise current I2). The magnitude of discharge current that passes through discharge current limiter stage 412A in the second direction can exceed discharge limits Discharge current limiter stage 412A senses the discharge current in the second direction, performs a discharge limiting operation on the discharge current and passes the discharge limited current in the second direction to inrush current limiter stage 410A. Because the discharge limited current is moving in the second direction, inrush current limiter stage 410A functions substantially as a closed switch and passes the discharge limited current substantially unchanged.

Internal power supply 404 draws a portion of the input power from voltage source 402A, regulates it and provides the regulated power to active components of bidirectional current limiter 408. The regulated power is further divided to independently supply reference voltages that are used by inrush current limiter stage 410A and discharge current limiter stage 412A to independently set the inrush current limit and the discharge current limit, respectively. When the power being applied to circuit 400A by voltage source 402A is abruptly interrupted, internal power source 404 receives power discharged from capacitive load 502 and uses the capacitive discharge power to continue supplying regulated power to active components of bidirectional current limiter 408A to maintain circuit operation during at least some portion of the desired circuit hold-up time.

The electronic components (i.e., 504, 506, 508, 510) of inrush current limiter stage 410A are, in effect, a mirror image of the electronic components (i.e., 504A, 506A, 508A, 510A) of discharge current limiter stage 412A. Accordingly, the series connection between inrush current limiter stage 410A and discharge current limiter stage 412A is an inverse series connection.

The electronic components of inrush current limiter stage 410A include a MOSFET switch 504 having a body diode 506 (which provides a path for current at power up), a current sense resistor 508 and a comparator (or operational amplifier) 510, configured and arranged as shown. Current sense resistor 508 is configured as a shunt across the input terminals of comparator 510. The output of comparator 510 controls the gate voltage applied to MOSFET switch 504 to thereby control the source/drain current flow through MOSFET switch 504. Similarly, the electronic components of discharge current limiter stage 412A include a MOSFET switch 504A having a body diode 506A (which provides a path for current at power up), a current sense resistor 508A and a comparator (or operational amplifier) 510A, configured and arranged as shown. Current sense resistor 508A is configured as a shunt across the input terminals of comparator 510A. The output of comparator 510A controls the gate voltage applied to MOSFET switch 504A to thereby control the source/drain current flow through MOSFET switch 504A.

Internal power supply 404 draws power at $V_{IN}$ from the positive terminal of dc voltage source 402A and provides regulated power to MOSFET switches 504, 504A and comparators 510, 510A from $V_{OUT}$. DC power supply 402A also supplies power to load 406A. The return line from load 406A passes through MOSFET switches 504, 504A and current sense resistors 508, 508A and flows back to the negative terminal of dc source 402A. Comparators 510, 510A convert current monitored by current sense resistors 508, 508A to voltages. Comparators 510, 510A compare these voltages reference voltages divided from the regulated power produced by internal power supply 404. For comparator 510, the reference voltage corresponds to an inrush current limit. For comparator 510A, the reference voltage corresponds to a discharge current limit. When comparators 510, 510A determine that the sense voltages exceed these references, gate drive voltage to MOSFET switches 504, 504A is reduced, limiting the current in either direction.

Figure 6:
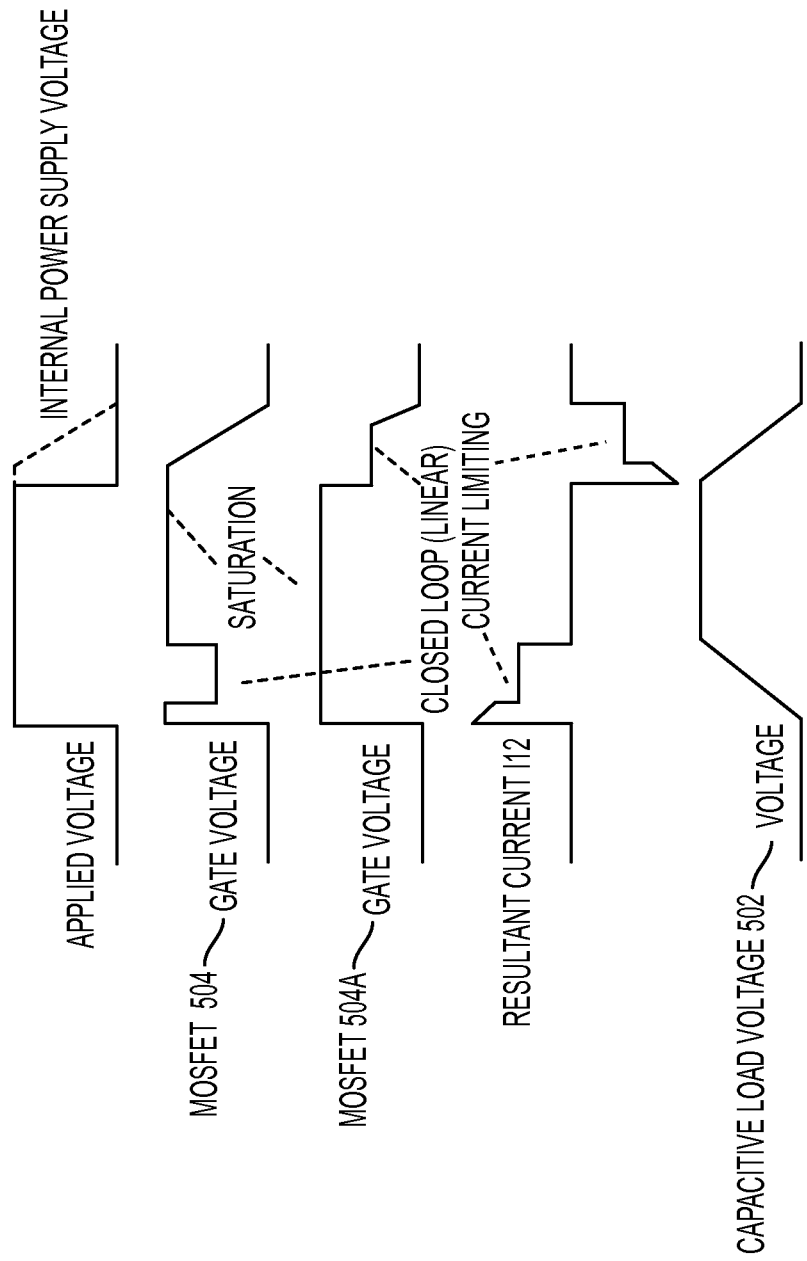
FIG. 6 depicts a timing diagram illustrating how the bidirectional current limiter shown in FIG. 5 can be operated.
Figure 7:
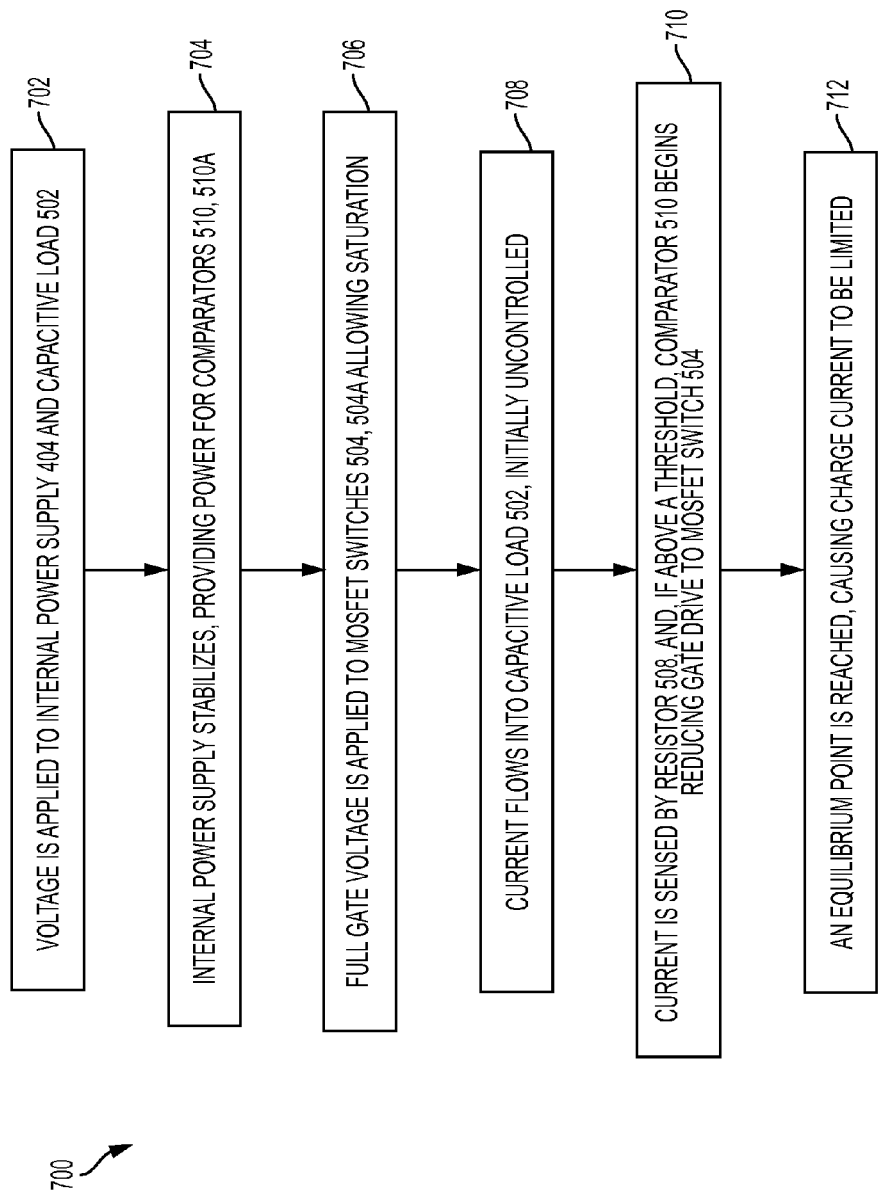
FIG. 7 depicts a flow diagram illustrating a methodology according to one or more embodiments.
Figure 8:
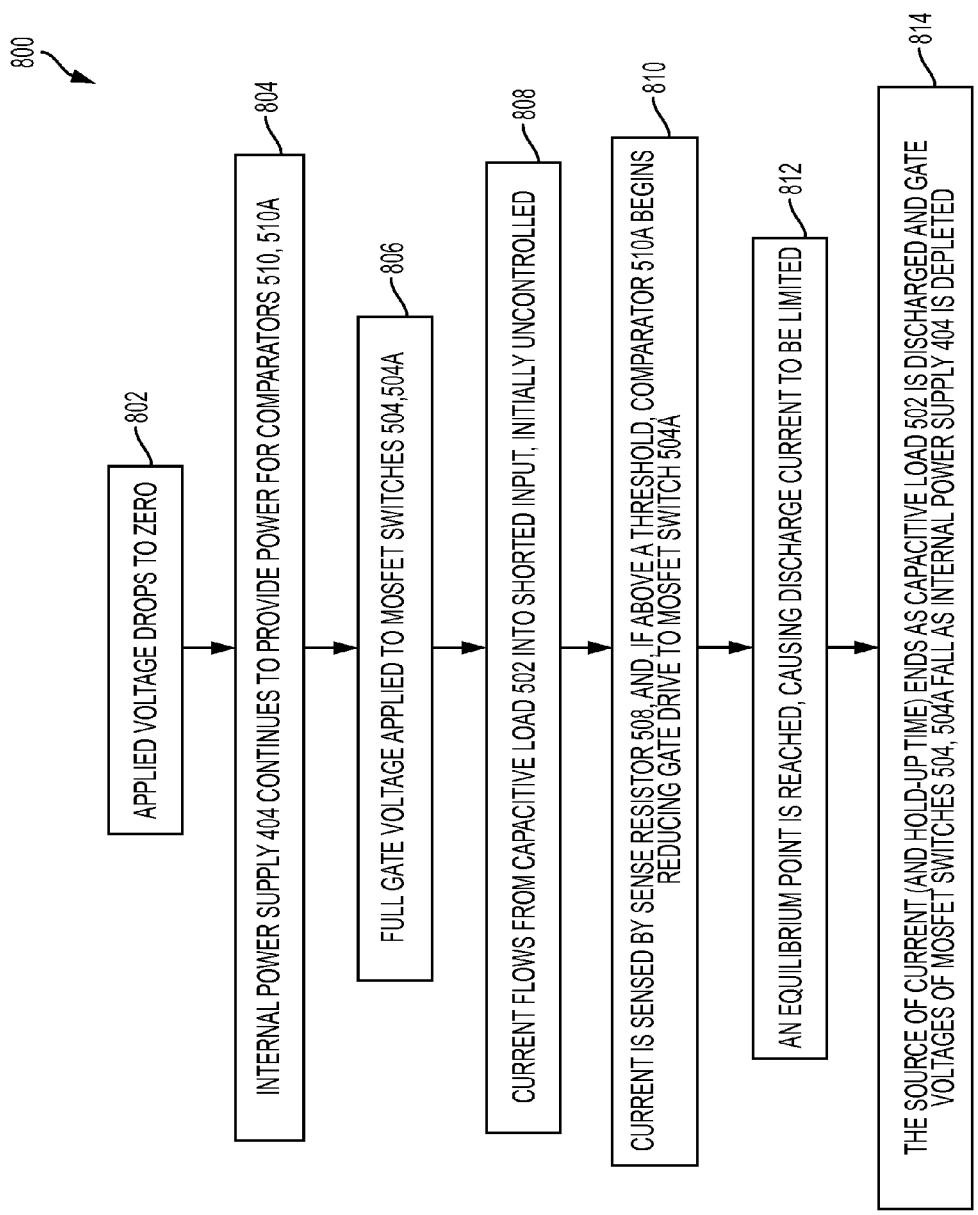
FIG. 8 depicts a flow diagram illustrating another methodology according to one or more embodiments.

FIG. 6 depicts a timing diagram illustrating certain signal changes over time during the application and subsequent removal of an applied voltage from dc voltage source 402A of circuit 400A shown in FIG. 5. FIGS. 7 and 8 depict methodologies 700, 800 illustrating the application and subsequent removal of an applied voltage from dc voltage source 402A of circuit 400A shown in FIG. 5. The operation of circuit 400A will now be described with reference to circuit 400A shown in FIG. 5, the timing diagram of FIG. 6 and the methodologies 700, 800 of FIGS. 7 and 8. Moving from left to right along the horizontal time axis (not shown) of the timing diagram of FIG. 6, voltage is applied to internal power supply 404 and load 406A (block 702). Internal power supply 404 stabilizes, providing power for comparators 510, 510A (block 704). The full gate voltage is applied to comparators 510, 510A, which allows comparators 510, 510A to reach saturation (block 706). Initially, capacitive load 502 is substantially a short circuit, so current flows, initially uncontrolled, into and out of load 406A (block 708). The current out of load 406A passes through body diode 506 and is sensed by current sense resistor 508. When comparator 510 determines that the sense current is above a threshold, comparator 510 begins reducing the gate drive of MOSFET switch 504, thereby current limiting the sensed current (block 710). An equilibrium point is reached, which causes charge current to be limited (block 712). The demand for inrush current ends as capacitive load 502 is charged to the dc source voltage, and the full gate voltage of MOSFET switch 504 is restored. Power is delivered to resistive load 503 with minimal voltage drop, which allows minimal power dissipation of resistive load 503 into MOSFET switch 504.

Subsequently, the applied voltage abruptly drops to zero, which may be caused by a short circuit between the input/output wires of dc voltage source 402A (block 802). Internal power supply 404 continues to provide power for comparators 510, 510A (block 804). The full gate voltage is applied to MOSFET switches 504, 504A (block 806). Current flows from capacitive load 502 into the short circuit now present across voltage source 402A, initially uncontrolled (block 808). The current out of load 406A passes through body diodes 506, inrush limiter 410A and is sensed by current sense resistor 508A. When comparator 510A determines that the sense current is above a threshold, comparator 510A begins reducing the gate drive of MOSFET switch 504A, thereby current limiting the sensed current (block 810). An equilibrium point is reached when the sensed current is limited (block 812). The source of current ends as capacitive load 502 is discharged, and the gate voltages of MOSFET switches 504, 504A fall as internal power supply 404 is depleted (block 814).

Figure 9:
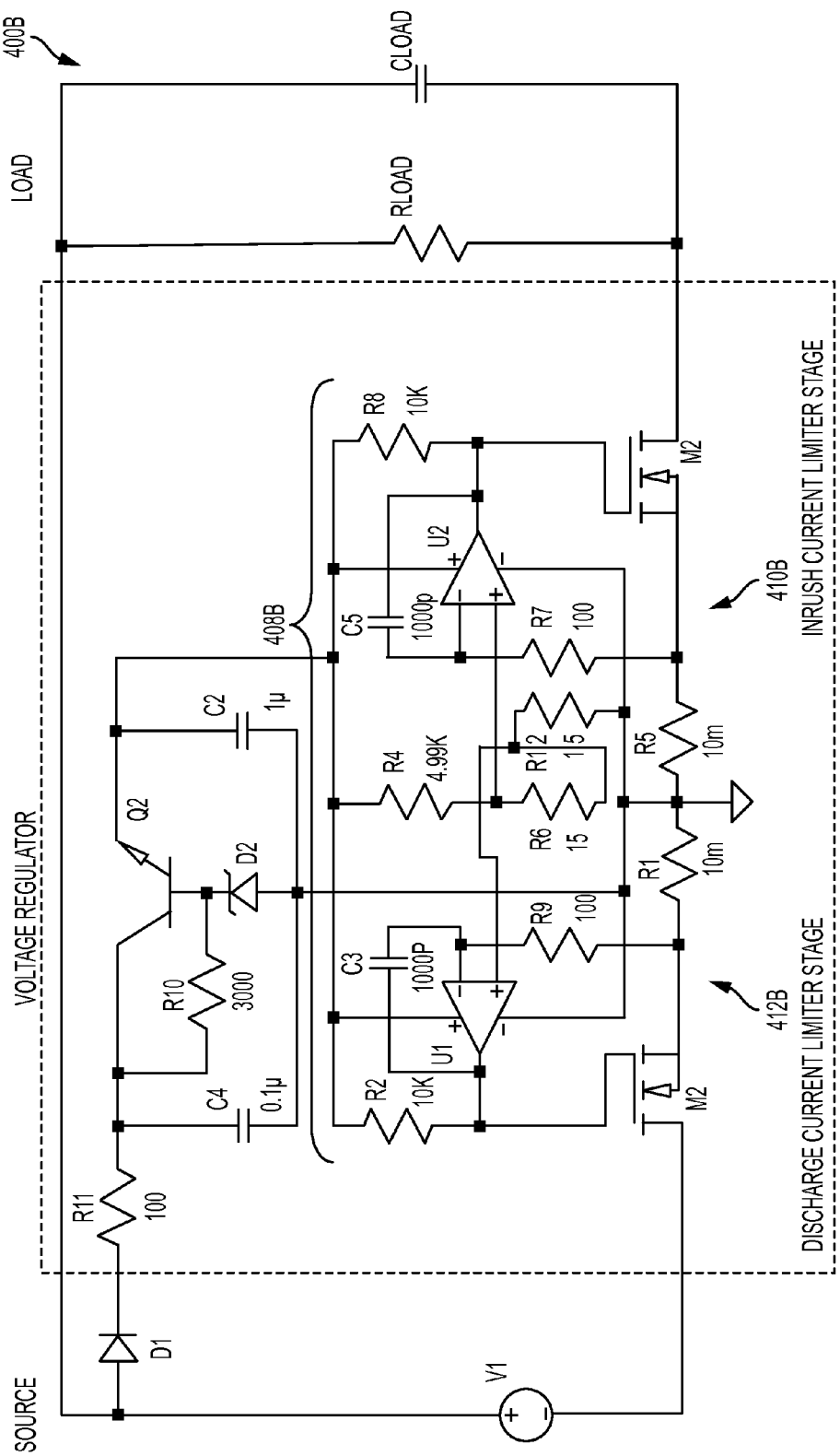
FIG. 9 depicts a circuit diagram illustrating a circuit having another more detailed embodiment of a bidirectional current limiter according to the present disclosure.

FIG. 9 depicts a circuit diagram illustrating a circuit 400B having a bidirectional current limiter 408B according to the present disclosure. Bidirectional current limiter 408B is a more detailed embodiment of bidirectional current limiters 408, 408A shown in FIGS. 4 and 5. Bidirectional current limiter 408B includes an inrush current limiter stage 410B and a discharge current limiter stage 412B, configured and arranged as shown. Similar to the bidirectional current limiter embodiments shown in FIGS. 4 and 5, the electronic components of inrush current limiter stage 410B are, in effect, a mirror image of the electronic components of discharge current limiter stage 412B. Accordingly, the series connection between inrush current limiter stage 410B and discharge current limiter stage 412B is an inverse series connection.

Circuit 400B is provided in sufficient detail and with example component values to facilitate the implementation of circuit 400B as a non-limiting, teaching example embodiment of the present disclosure, wherein V1 is 28V, the regulated voltage is 15V and the current limit for inrush and discharge is 10 amperes. The current limit could be expressed in terms of a not-to-exceed current level, or it may be expressed in ampere/seconds, which limits the average current over a specific period of time.

A shown in FIG. 9, when V1 is applied to circuit 400B, current flows clockwise from the V1 to CLoad. Before CLoad is fully charged, CLoad initially functions as a short circuit. Accordingly, the initial current flows clockwise through CLoad and attempt to pass through MOSFET M1. M1 is initially in its reverse bias state, so it appears an open circuit. At the same time, a portion of the V1 also flows through D1 and R11 into the Voltage Regulator, which provides a regulated 15V output at the emitter of Q2. D1 protects Q2 from reverse base-emitter voltages during discharge of C2. D1 also extends the hold-up time of C2. The regulated 15V powers comparators U2 and U1. The regulated 15V also creates a voltage reference generated by R4.

The voltage reference at the bottom of R4 goes into the positive input terminal of U2, which attempts to turn on the comparator U2. This forces the output terminal of U2 to go high because there is no current yet through R5. The voltage at the negative input terminal of U2 is zero. However, because the positive input terminal of U2 is positive with respect to the negative input terminal of U2, the output terminal of U2 goes high, which turns on the gate voltage of MOSFET M1. When the gate voltage of MOSFET M1 is high, MOSFET M1 turns on, and MOSFET M1 provides a path for inrush current to flow from CLoad clockwise through MOSFET M1, R5, R1 and the body diode (shown by the upward pointing arrow) of MOSFET M2.

Because CLoad has very low impedance and a very low voltage at power start-up, the clockwise current will rise sharply, which causes a proportional voltage drop across R5. R5 feeds into the negative input terminal of U2, and when the voltage across R5 exceeds the reference voltage that is fixed on the positive input terminal of U2, the output terminal of U2 attempts to turn off MOSFET M1 by lowering the output terminal voltage of U2. This creates a closed loop condition, wherein the current will stabilize to a constant current mode and constant current value when the voltage across R5 matches the voltage applied to the positive input terminal of U2, thereby controlling voltage rises across CLoad and limiting inrush currents through circuit 400B. When CLoad is fully charged, the current drops off sharply, and then MOSFET M1 becomes a short circuit again because the gate voltage of MOSFET M1 stays high.

If V1 is interrupted by a fault condition and becomes a short circuit rather than a voltage source, the energy that is stored in CLoad generates discharge current that flows counterclockwise out of the input terminals of CLoad and attempts flow though MOSFET M2. Because, MOSFET M2 is already in an "on" state, the discharge current flow through it and is sensed by R1. A resulting voltage drop is established across R1 and sensed by the negative input terminal of U1. When U1 determines that voltage at the negative input terminal of U1 exceeds the reference voltage at the positive terminal of U1, the output terminal of U1 attempts to turn off MOSFET M2 by lowering the output terminal voltage of U1. This creates a closed loop condition, wherein the discharge current will stabilize to a constant current mode and constant current value when the voltage across R1 matches the voltage applied to the positive input terminal of U1, thereby controlling voltage discharge from CLoad and limiting discharge current through circuit 400B. U1 controls the discharge current to a safe level until all the energy in CLoad has been dissipated.

Because the discharge energy from CLoad flows counterclockwise it also powers the voltage regulator, and this discharge power from CLoad is used by the voltage regulator to keep circuit 400B in operation over the time it takes to deplete the energy from CLoad. After CLoad is depleted, MOSFETS M1 and M2 go to the open state and current flow terminates.

Figure 10:
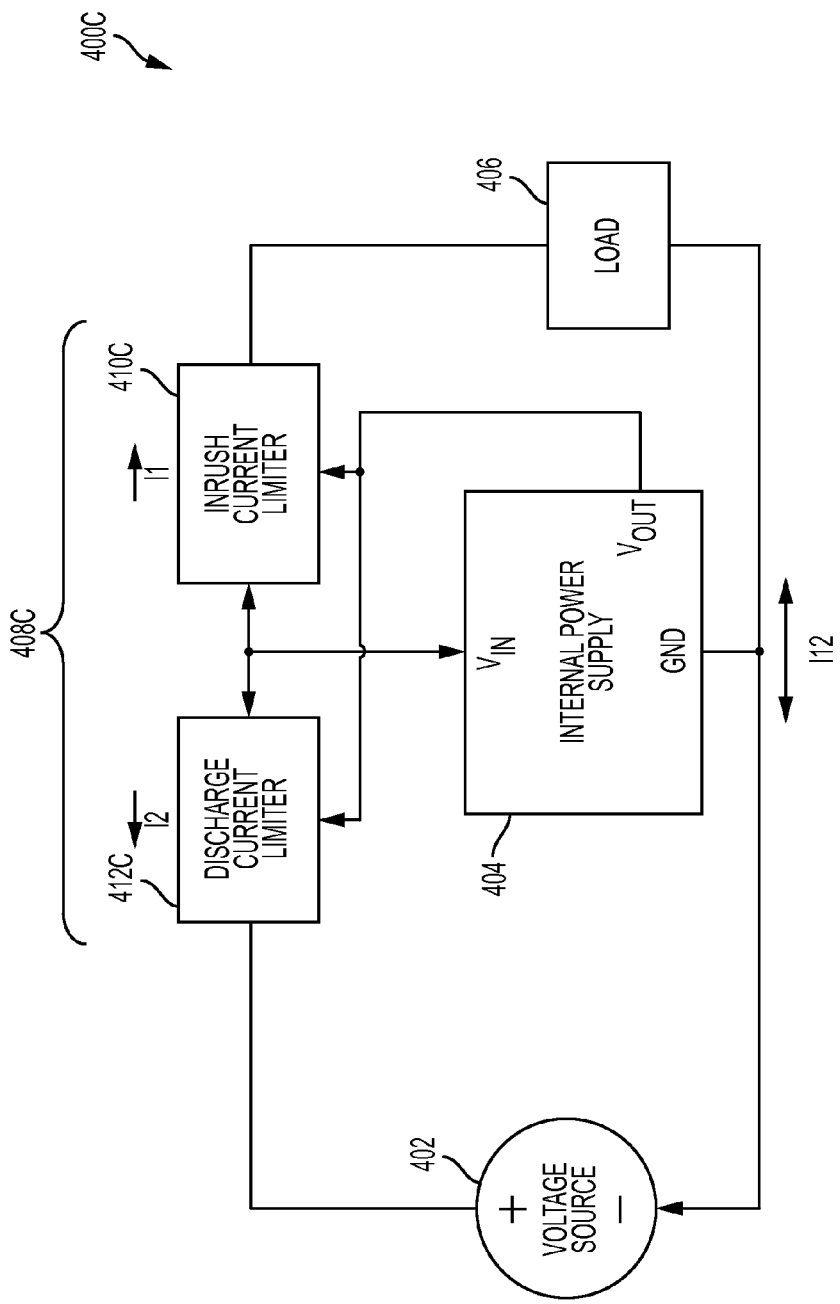
FIG. 10 depicts a block diagram illustrating a circuit having a positive side, bidirectional current limiter according to the present disclosure.

FIG. 10 depicts a block diagram illustrating a circuit 400C having a bidirectional current limiter 408C according to the present disclosure. Circuit 400C includes voltage source 402, internal power supply 404, load 406 and bidirectional current limiter 408C, configured and arranged as shown. Bidirectional current limiter 408C includes an inrush current limiter stage 410C in series with a discharge current limiter stage 412C. Circuit 400C is an alternative configuration of circuit 400 (shown in FIG. 4), wherein discharge current limiter stage 412C and inrush current limiter stage 410C are provided between the positive terminal of voltage source 402 and load 406. Additionally, internal power supply 404 accesses a portion of the power supplied by voltage source 402 by tapping into a connection between discharge current limiter stage 412C and inrush current limiter stage 410C. A common ground (Gnd) is provided throughout circuit 400C. The order of the inverse-series connection between discharge current limiter stage 412C and inrush current limiter stage 410C may be reversed.

Because bidirectional current limiters 408A, 408B (shown in FIGS. 5 and 9, respectively) are on the "negative" side of voltage sources 402A, V1, n-channel MOSFETS 504, 504A, M1, M2 are used to perform the primary current limiting operations. Because bidirectional current limiter 408C (shown in FIG. 11) is on the "positive" side of voltage source 402, p-channel MOSFETS (not shown) are used to perform the primary current limiting operations. When a p-channel MOSFET is used to perform the primary current limiting operations, the MOSFET gate is pulled negative with respect to its source terminal in order to turn the MOSFET on. This p-channel MOSFET operation logic is inverted compared to n-channel MOSFETS 504, 504A, M1, M2 of bidirectional current limiters 408A, 408B. Because a comparator can only pull its output down to its ground terminal, to turn off a positive side p-channel MOSFET, an inverter in the form of a PNP transistor (not shown) is employed. When an overcurrent condition exists in circuit 400C, its sense resistor provides voltage in excess of the threshold voltage to the comparator, which pulls the comparator output down. When this happens, the PNP transistor is turned on, which quickly removes charge from the gate of the p-channel MOSFET and causes bidirectional current limiter 408C to enter the previously described closed loop feedback mode, which allows current limiting. Accordingly, PNP transistor cancels the inversion created by the p-channel MOSFETs of bidirectional current limiter 408C.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure.

Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

The invention claimed is:

1. A current limiter comprising:
an inrush limiting stage; and
a discharge limiting stage communicatively coupled in series with the inrush limiting stage;
the inrush limiting stage configured to receive a first input current in a first direction, perform an inrush limiting operation on the first input current and pass an inrush limited output current in the first direction to the discharge limiting stage;
the discharge limiting stage configured to always remain operational to pass the inrush limited output current substantially unchanged in the first direction, including remaining operational during the entire time that the inrush limiting stage is operational to receive the second input current in the second direction, perform the inrush limiting operation on the first input current, and pass the inrush limited output current in the first direction to the discharge limiting stage;
the discharge limiting stage further configured to receive a second input current in a second direction, perform a discharge limiting operation on the second input current, and pass a discharge limited output current in the second direction to the inrush limiting stage;
the inrush limiting stage further configured to always remain operational to pass the discharge limited output current substantially unchanged in the second direction, including remaining operational during the entire time that the discharge limiting stage is operational to receive the second input current in the second direction, perform the discharge limiting operation on the second input current, and pass the discharge limited output current in the second direction to the inrush limiting stage.

2. The limiter of claim 1, wherein:
the inrush limiting operation comprises generating the inrush limited output current based at least in part on a determination that the first input current exceeds a predefined steady state inrush limit.

3. The limiter of claim 1, wherein:
the discharge limiting operation comprises generating the discharge limited output current based at least in part on a determination that the second input current exceeds a predefined steady state discharge limit.

4. The limiter of claim 1, wherein:
the inrush limiting stage comprises a bidirectional switching circuit;
the bidirectional switching circuit is configured to perform the inrush limiting operation based at least in part on current moving through the bidirectional switching circuit in the first direction;
the bidirectional switching circuit is further configured to perform a closed switch operation based at least in part on current moving through the bidirectional switching circuit in the second direction; and
the closed switch operation comprises passing, substantially unchanged, current moving through the bidirectional switching circuit in the first direction.

5. The limiter of claim 1, wherein:
the discharge limiting stage comprises a bidirectional switching circuit;
the bidirectional switching circuit is configured to perform the discharge limiting operation based at least in part on current moving through the bidirectional switching circuit in the second direction;
the bidirectional switching circuit is further configured to perform a closed switch operation based at least in part on current moving through the bidirectional switching circuit in the second direction; and
the closed switch operation comprises passing, substantially unchanged, current moving through the bidirectional switching circuit in the second direction.

6. The limiter of claim 1, wherein a set of inrush limiting circuit components of the inrush limiting stage are arranged in a mirror image relationship with a set of discharge circuit, components of the discharge limiting stage.

7. The limiter of claim 6, wherein the discharge limiting stage is communicatively coupled in an inverse-series relationship to the inrush limiting stage.

8. The limiter of claim 1, wherein the inrush limiting stage comprises:
a resistive circuit;
a comparator circuit communicatively coupled to the resistive circuit; and
a switching circuit communicatively coupled to the resistive circuit and to the comparator circuit;
the inrush limiting operation comprising:
sensing, using the resistive circuit, a portion of the first input current in the first direction;
determining, using the comparator circuit, whether the portion of the first input current sensed by the resistive circuit exceeds an inrush current limit; and
based at least in part on the comparator circuit determining that the portion of the first input current sensed by the resistive circuit exceeds the inrush limit, activating, using the comparator circuit, the switching circuit to generate the inrush limited output current and pass the inrush limited output current in the first direction to the discharge limiting stage.

9. The limiter of claim 1, wherein the discharge limiting stage comprises:
a resistive circuit;
a comparator circuit communicatively coupled to the resistive circuit; and
a switching circuit communicatively coupled to the resistive circuit and to the comparator circuit;
the discharge limiting operation comprising:
sensing, using the resistive circuit, a portion of the second input current in the second direction;

determining, using the comparator circuit, whether the portion of the second input current sensed by the resistive circuit exceeds a discharge current limit; and based at least in part on the comparator circuit determining that the portion of the second input current sensed by the resistive circuit exceeds the discharge limit, activating, using the comparator circuit, the switching circuit to generate the discharge limited output current and pass the discharge limited output current in the second direction to the inrush limiting stage.

10. A method of forming a current limiter, the method comprising:

providing an inrush limiting stage;

providing a discharge limiting stage communicatively coupled in series with the inrush limiting stage;

configuring the inrush limiting stage to receive a first input current in a first direction, perform an inrush limiting operation on the first input current and pass an inrush limited output current in the first direction to the discharge limiting stage;

configuring the discharge limiting stage to always remain operational to pass the inrush limited output current substantially unchanged in the first direction, including remaining operational during the entire time that the inrush limiting stage is operational to receive the second input current in the second direction, perform the inrush limiting operation on the first input current, and pass the inrush limited output current in the first direction to the discharge limiting stage;

configuring the discharge limiting stage to receive a second input current in a second direction, perform a discharge limiting operation on the second input current and pass a discharge limited output current in the second direction to the inrush limiting stage; and configuring the inrush limiting stage to always remain operational to pass the discharge limited output current substantially unchanged in the second direction, including remaining operational during the entire time that the discharge limiting stage is operational to receive the second input current in the second direction, perform the discharge limiting operation on the second input current, and pass the discharge limited output current in the second direction to the inrush limiting stage.

11. The method of claim 10, wherein the inrush limiting stage comprises a bidirectional switching circuit, the method further comprising:

configuring the bidirectional switching circuit to perform the inrush limiting operation based at least in part on current moving through the bidirectional switching circuit in the first direction; and configuring the bidirectional switching circuit to perform a closed switch operation based at least in part on current moving through the bidirectional switching circuit in the second direction;

wherein the closed switch operation comprises passing, substantially unchanged, current moving through the bidirectional switching circuit in the first direction.

12. The method of claim 10, wherein the discharge limiting stage comprises a bidirectional switching circuit, the method further comprising:

configuring the bidirectional switching circuit to perform the discharge limiting operation based at least in part on current moving through the bidirectional switching circuit in the second direction; and configuring the bidirectional switching circuit to perform a closed switch operation based at least in part on current moving through the bidirectional switching circuit in the second direction;

wherein the closed switch operation comprises passing, substantially unchanged, current moving through the bidirectional switching circuit in the second direction.

13. The method limiter of claim 10 further comprising:

arranging a set of inrush limiting circuit components of the inrush limiting stage in a mirror image relationship with a set of discharge circuit components of the discharge limiting stage.

14. The method of claim 10 further comprising communicatively coupling the discharge limiting stage to the inrush limiting stage in an inverse-series relationship.

15. A three-terminal bi-directional current limiter circuit comprising:

three terminals comprising:

a first terminal communicatively coupled to a capacitive load and an inrush limiting stage of the current limiter circuit;

a second terminal communicatively coupled to a voltage source and a discharge limiting stage of the current limiter circuit, wherein the discharge limiting stage is communicatively coupled in series with the inrush limiting stage through a common positive rail;

a third terminal communicatively coupled to an internal power supply, the inrush limiting stage, and the discharge limiting stage;

the inrush limiting stage configured to receive a first input current in a first direction at the first terminal, perform an inrush limiting operation on the first input current, and pass an inrush limited output current in the first direction to the discharge limiting stage;

the discharge limiting stage configured to always remain operational to pass the inrush limited output current substantially unchanged in the first direction, including remaining operational during the entire time that the inrush limiting stage is operational to receive the first input current in the first direction, perform the inrush limiting operation on the first input current, and pass an inrush limited output current in the first direction to the discharge limiting stage;

the discharge limiting stage further configured to receive a second input current in a second direction at the second terminal, perform a discharge limiting operation on the second input current, and pass a discharge limited output current in the second direction to the inrush limiting stage;

the inrush limiting stage further configured to always remain operational to pass the discharge limited output current substantially unchanged in the second direction, including remaining operational during the entire time that the discharge limiting stage is operational to receive the second input current in the second direction, perform the discharge limiting operation on the second input current, and pass the discharge limited output current in the second direction to the inrush stage.

16. The circuit of claim 15 wherein:

the voltage source is communicatively coupled to the capacitive load;

the internal power supply is communicatively coupled to the voltage source and the capacitive load;

the internal power supply is configured to receive an input voltage from the voltage source, generate an output power and provide an internal power supply output to the third terminal;

the inrush limiting stage comprises a first voltage divider circuit configured to process the internal power supply output to provide a first reference voltage that is used by the inrush limiting stage as part of setting an inrush current limit of the inrush limiting operation;

the discharge limiting stage comprises a second voltage divider circuit configured to process the internal power supply output to provide a second reference voltage that is used by the discharge limiting stage as part of setting a discharge current limit of the discharge liming operation;

the regulated power is further divided to independently supply reference voltages that are used by the inrush current limiter stage and the discharge current limiter stage to independently set the inrush current limit and the discharge current limit, respectively;

the first voltage divider is configured to operate independently of the second voltage divider to enable the first reference voltage and the second reference voltage to be set at different values.

17. The circuit of claim 16, wherein:

the capacitive load is configured to generate a dissipation voltage in response to a short circuit at the voltage source; and the internal power supply is further configured to receive the dissipation voltage, generate a hold-up output power and provide the hold-up output power to the bi-directional current limiter.

18. The circuit of claim 15, wherein:

a set of inrush limiting circuit components of the inrush limiting stage are arranged in a mirror image relationship with a set of discharge circuit components of the discharge limiting stage; and the discharge limiting stage is communicatively coupled in an inverse-series relationship to the inrush limiting stage.

19. The circuit of claim 15, wherein the inrush limiting stage comprises:

a resistive circuit;

a comparator circuit communicatively coupled to the resistive circuit; and a switching circuit communicatively coupled to the resistive circuit and to the comparator circuit;

the inrush limiting operation comprising:

sensing, using the resistive circuit, a portion of the first input current in the first direction:

determining, using the comparator circuit, whether the portion of the first input current sensed by the resistive circuit exceeds an inrush current limit; and based at least in part on the comparator circuit determining that the portion of the first input current sensed by the resistive circuit exceeds the inrush limit, activating, using the comparator circuit, the switching circuit to generate the inrush limited output current and pass the inrush limited output current in the first direction to the discharge limiting stage.

20. The circuit of claim 15, wherein the discharge limiting stage comprises:

a resistive circuit;

a comparator circuit communicatively coupled to the resistive circuit; and a switching circuit communicatively coupled to the resistive circuit and to the comparator circuit;

the discharge limiting operation comprising:

sensing, using the resistive circuit, a portion of the second input current in the second direction;

determining, using the comparator circuit, whether the portion of the second input current sensed by the resistive circuit exceeds a discharge current limit; and based at least in part on the comparator circuit determining that the portion of the second input current sensed by the resistive circuit exceeds the discharge limit, activating, using the comparator circuit, the switching circuit to generate the discharge limited output current and pass the discharge limited output current in the second direction to the inrush limiting stage.

* * * * *